(12) United States Patent
Anzengruber et al.

(10) Patent No.: US 9,643,278 B2
(45) Date of Patent: May 9, 2017

(54) HOSE ASSEMBLY AND COUPLING DEVICE FOR A WELDING DEVICE

(75) Inventors: Thomas Anzengruber, Linz (AT);
Rudolf Brandstoetter, Kirchham (AT)

(73) Assignee: FRONIUS International GmbH, Pettenbach (AT)

( * ) Notice: Subject to any disclaimer, the term of this patent is extended or adjusted under 35 U.S.C. 154(b) by 1160 days.

(21) Appl. No.: 13/395,226

(22) PCT Filed: Aug. 27, 2010

(86) PCT No.: PCT/AT2010/000307
§ 371 (c)(1),
(2), (4) Date: May 17, 2012

(87) PCT Pub. No.: WO2011/029109
PCT Pub. Date: Mar. 17, 2011

(65) Prior Publication Data
US 2012/0228271 A1    Sep. 13, 2012

(30) Foreign Application Priority Data

Sep. 11, 2009    (AT) .................................. A 1447/2009

(51) Int. Cl.
*B23K 9/32*    (2006.01)

(52) U.S. Cl.
CPC .................................. *B23K 9/323* (2013.01)

(58) Field of Classification Search
CPC .............. B23K 9/12; B23K 9/28; B23K 9/32
USPC ...... 219/74, 137.61, 137.62, 137.63, 137.71, 219/137.9; 439/283, 180, 309, 889; 285/18, 30–41, 120.1, 260–261, 397–404
See application file for complete search history.

(56) References Cited

U.S. PATENT DOCUMENTS

| 2,527,235 | A |   | 10/1950 | Tuthill et al. |
| 2,908,512 | A | * | 10/1959 | Morrow .......................... 285/12 |
| 2,951,934 | A |   | 9/1960 | Engel |
| 3,196,249 | A | * | 7/1965 | Thostrup .................. 219/137.63 |

(Continued)

FOREIGN PATENT DOCUMENTS

| CN | 2063062 U | 10/1990 |
| CN | 1436949 A | 8/2003 |

(Continued)

OTHER PUBLICATIONS

International Search Report on PCT/AT2010/000307 dated Apr. 11, 2011.

*Primary Examiner* — Michael Laflame, Jr.
(74) *Attorney, Agent, or Firm* — Collard & Roe, P.C.

(57) ABSTRACT

A hose assembly includes a plurality of lines for supplying a welding torch with operating media, such as welding current, welding wire, protective gas and/or control signals. The lines include a coolant line for feeding cooling medium of a coolant source to a welding torch. The hose assembly has a coupling element for detachably connecting to a welding unit or to a welding torch. A further coupling element for the coolant line is integrated in the coupling element. The coupling and decoupling direction of the further coupling element is orientated transverse to the longitudinal axis of the hose assembly. The coupling elements can each be coupled and decoupled independently from each other. A plug element is used in the coupling element. The coolant line has a plug connection.

15 Claims, 6 Drawing Sheets

(56) References Cited

U.S. PATENT DOCUMENTS

Figure 1:
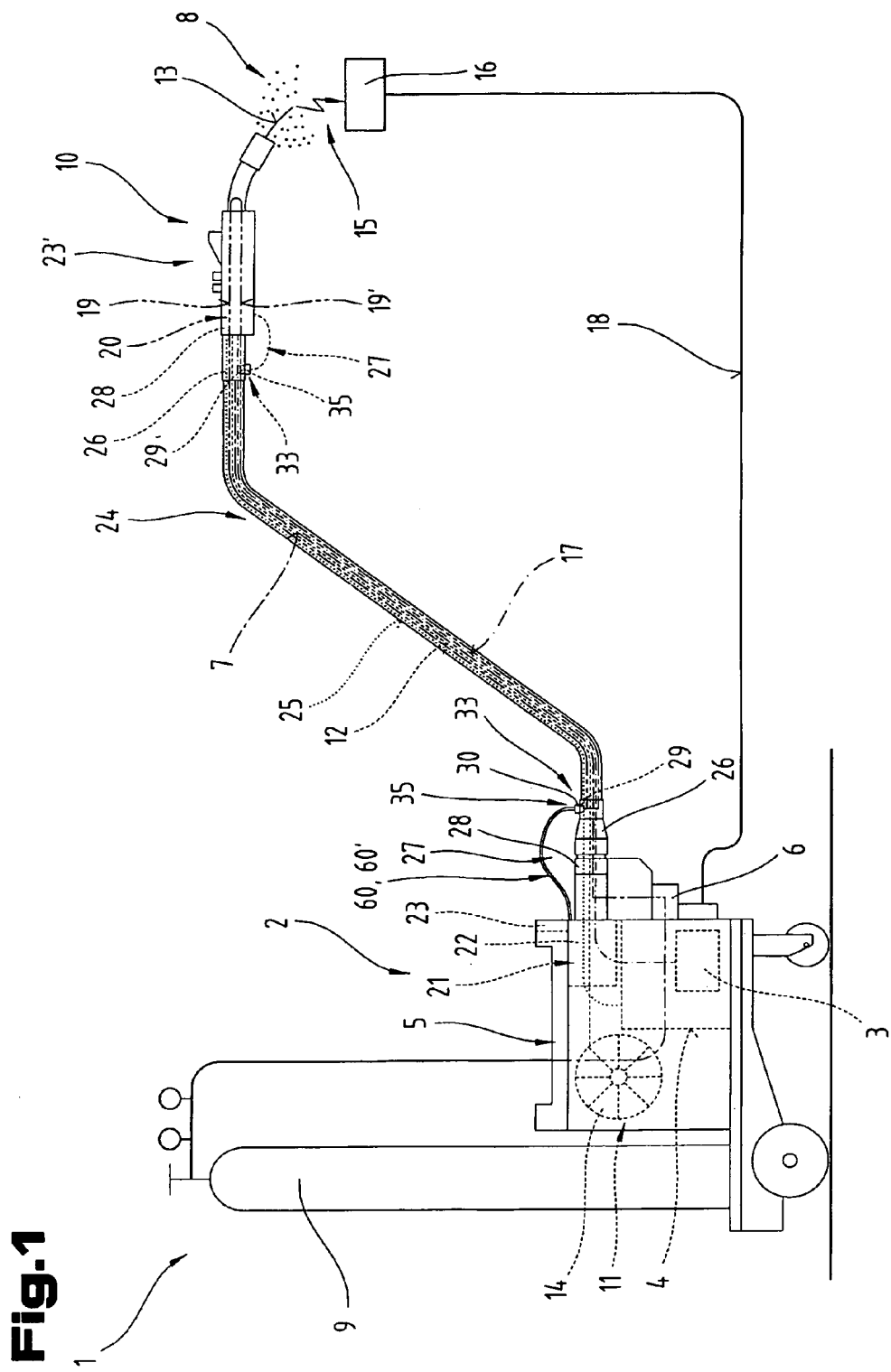

| | | | |
|---|---|---|---|
| 4,210,796 A | 7/1980 | Moerke | |
| 4,864,099 A | 9/1989 | Cusick, III et al. | |
| 4,982,736 A | 1/1991 | Schneider | |
| 5,323,808 A | 6/1994 | Shimizu | |
| 5,387,117 A | 2/1995 | Moyher, Jr. et al. | |
| 5,527,235 A | 6/1996 | Kuroda et al. | |
| 5,765,879 A * | 6/1998 | de Jong et al. | 285/189 |
| 6,078,023 A * | 6/2000 | Jones et al. | 219/137.63 |
| 6,138,987 A * | 10/2000 | Lee | 251/152 |
| 6,402,443 B1 * | 6/2002 | Hoppe | 409/230 |
| 6,530,604 B1 * | 3/2003 | Luft et al. | 285/190 |
| 6,629,683 B2 * | 10/2003 | Wang | 251/315.1 |
| 6,802,855 B2 | 10/2004 | Ellingboe et al. | |
| 6,827,728 B2 | 12/2004 | Ellingboe et al. | |
| 6,851,723 B2 * | 2/2005 | Usui et al. | 285/190 |
| 7,274,001 B1 * | 9/2007 | Cusick, III | 219/137.62 |
| 7,401,820 B2 * | 7/2008 | Niki | 285/376 |
| 7,469,933 B2 * | 12/2008 | Swift et al. | 285/86 |
| 7,472,931 B2 * | 1/2009 | Kerin et al. | 285/319 |
| 8,389,899 B2 * | 3/2013 | Natta | 219/136 |
| 2004/0140295 A1 | 7/2004 | Herres | |
| 2005/0205542 A1 | 9/2005 | DeCoster et al. | |
| 2006/0278621 A1 | 12/2006 | Takahashi et al. | |
| 2006/0279079 A1 * | 12/2006 | Weber | 285/33 |
| 2007/0017911 A1 | 1/2007 | Mishima et al. | |
| 2007/0057509 A1 * | 3/2007 | Beal et al. | 285/402 |
| 2007/0164074 A1 | 7/2007 | Schorghuber et al. | |
| 2008/0012315 A1 * | 1/2008 | Rose | 285/317 |
| 2008/0128164 A1 * | 6/2008 | Johnson | 174/660 |
| 2008/0128166 A1 * | 6/2008 | Forgang et al. | 175/50 |
| 2008/0277935 A1 * | 11/2008 | Killingbeck | 285/403 |
| 2009/0001714 A1 * | 1/2009 | Danielson | 285/119 |
| 2009/0127320 A1 * | 5/2009 | McKee, Jr. | 228/219 |
| 2010/0148488 A1 * | 6/2010 | Homola | 285/12 |

FOREIGN PATENT DOCUMENTS

| | | |
|---|---|---|
| CN | 2612500 Y | 4/2004 |
| CN | 2649916 Y | 10/2004 |
| CN | 2761343 Y | 3/2006 |
| CN | 101216136 A | 7/2008 |
| DE | 2648384 A1 | 6/1977 |
| DE | 38 25 313 | 2/1990 |
| DE | 42 07 277 | 7/1993 |
| EP | 1 584 399 | 10/2005 |
| FR | 2334906 A1 | 7/1977 |
| GB | 1208331 A | 10/1970 |
| JP | H02239862 A | 9/1990 |
| JP | H06-1985 U | 1/1994 |
| JP | 2000028207 A | 1/2000 |
| JP | 2006007242 A | 1/2006 |
| JP | 2006007256 A | 1/2006 |
| WO | WO 2004/105992 | 12/2004 |

* cited by examiner

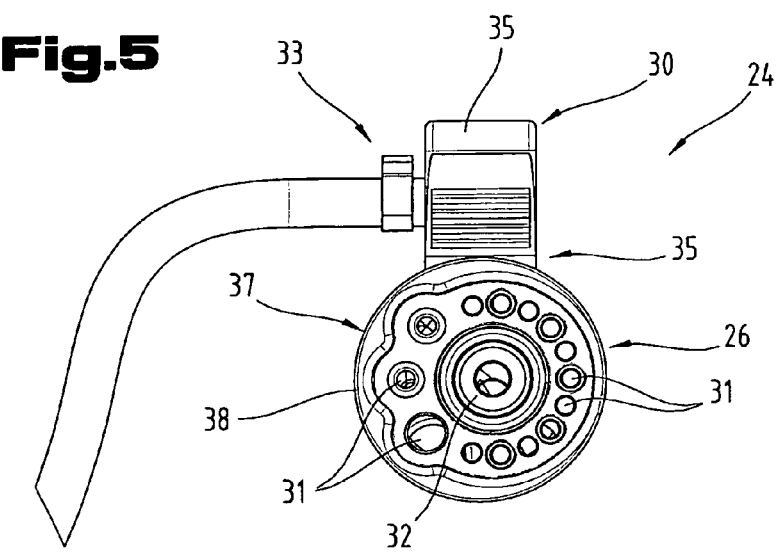
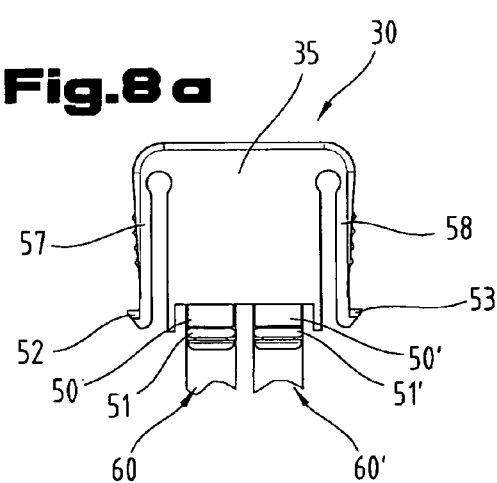
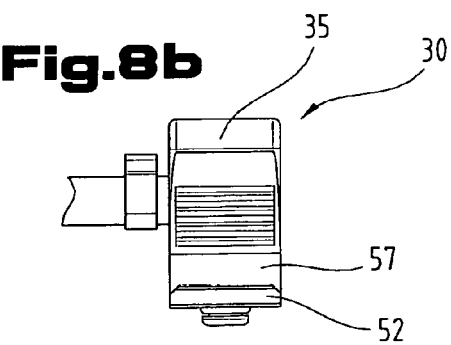
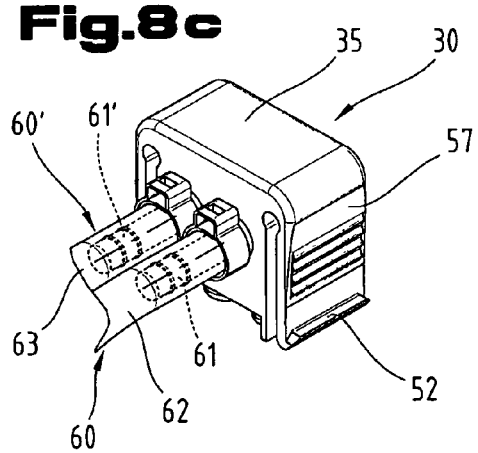
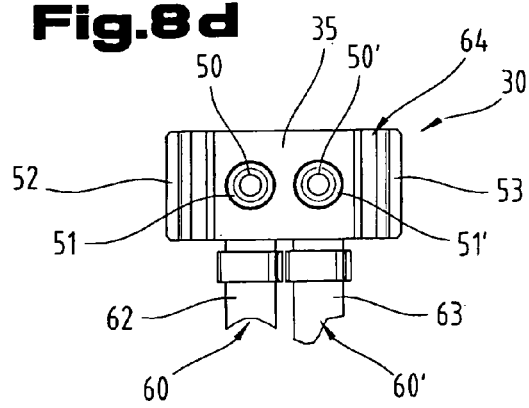

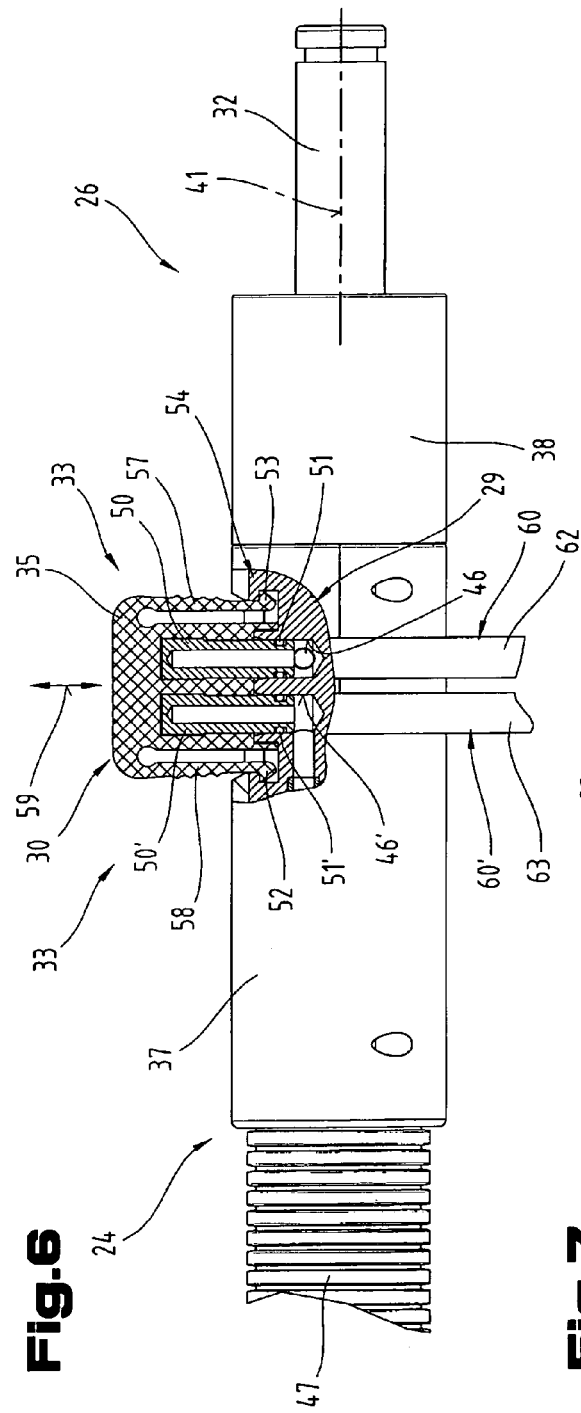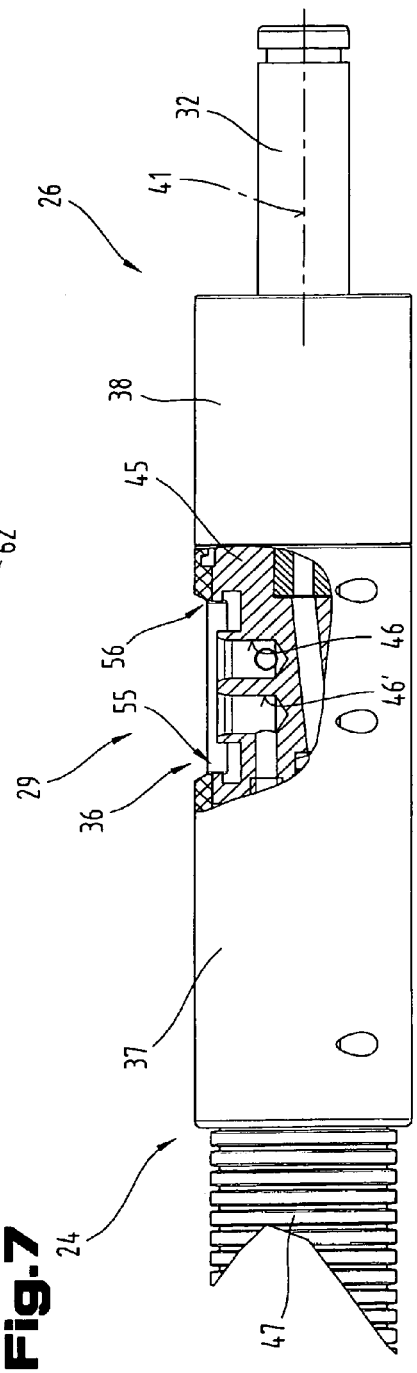

1

HOSE ASSEMBLY AND COUPLING DEVICE FOR A WELDING DEVICE

CROSS REFERENCE TO RELATED APPLICATIONS

This application is the National Stage of PCT/AT2010/000307 filed on Aug. 27, 2010 which claims priority under 35 U.S.C. §119 of Austrian Application No. A 1447/2009 filed on Sep. 11, 2009, the disclosure of which is incorporated by reference. The international application under PCT article 21(2) was not published in English.

The invention relates to a hose assembly, comprising a plurality of lines for supplying a welding torch with the respective operating media, furthermore a coupling element, which can be connected to a hose assembly, a plug element for at least one coolant line extending between a coolant source and a welding torch, a plug connection within the cooling circuit between a cooling source and a welding torch, as well as a welding fixture.

From prior art, many welding fixtures are known, the welding torch of which is connected with a welding unit or a welding current source by a hose assembly being as flexible as possible, which comprises several lines for transmitting electrical and gaseous operating media. In order to exchange or change the welding torch or the hose assembly as quickly as possible, the ending of the hose assembly situated opposite relative the welding torch is equipped with a plug element, which can be coupled to a coupling bushing or a so-called general connection at the welding unit. Using a coupling system of this kind, the diverse lines for the welding current, the welding wire, the protective gas but also control lines are usually approximately simultaneously or only by one coupling process respective the welding unit optionally coupled or decoupled. Due to the combined possibility to couple electrical and gaseous lines, such coupling devices are referred to as general or multiple coupling devices. For this purpose, in the plug element on the side of hose assembly and in the corresponding coupling bushing on the side of the welding unit, electrical connections that are embodied in different ways and respectively correspond to one another and fluidic connector elements are provided. It is similarly known to embody electrical control lines between the welding torch and the welding unit in a coupleable that means optionally detachable and connectable way by means of an individual control line plug. These connection systems have proofed their worth in terms of transmission of electrical and gaseous media at a welding torch. Said concept of connection is nevertheless only satisfactory to a certain extent for welding torches, which are to be used with an active cooling.

The objective of the present invention is on the one hand provided by a hose assembly as described herein, by a coupling device as described herein, by a plug element as described herein, or by a plug connection as described herein.

Due to the embodiments described herein it is among other things achieved that a certain coupling state in respect of the electrical control signs or in respect of the at least one electrical line for the welding energy and/or in respect of the at least one line for the gaseous operating media, as for example welding gas and/or compressed air can be optionally changed, in particular activated or deactivated, irrespective of the coupling state of the at least one coolant line to the welding torch. The coolant circuit can for example remain unchanged and closed, whereas the multiple coupling device, in particular the general coupling connection can be detached of decoupled for the transmission of electrical control signs or primary operating media, as for example welding wire, welding current and/or protective gas. It is thus allowed to insert for example a new or different welding wire into the hose assembly or to perform control or maintain functions at the multiple coupling device during the coupling connection for the preferably fluid coolant medium, in particular for appropriate cooling water, remains unchanged and coupled or active. This means that it is not necessary that the cooling circuit is open to allow possible control or maintenance operations with respect to the multiple coupling device or the general connection of the hose assembly. On the other hand, the multiple coupling device for the electrical or gaseous operation media or for the respective control or data lines can remain unchanged and coupled, whereas the at least one coolant line is disconnected and in particular the cooling circuit is interrupted. The individual coolant coupling, which is with respect to the general multiple connection arranged with a distance between the hose assembly and welding unit, causes additionally the advantage that the danger of electrical short circuits is considerably reduced. In particular the danger of a short circuit between electrical lines or contact points between the welding unit and the welding torch is highly reduced because the coolant coupling is embodied separated and can thus be operated systematically or considerably more consciously. Probable cases of carelessness of the respective operating or maintaining person thus not necessarily cause electrical failures or damages within the welding device. The individual coolant coupling furthermore causes the advantage that the hose assembly can be passed in the feedthroughs of a so-called hollow-shaft robot, without making it necessary to mount coupling elements. As a consequence, the passing of the hose assembly is considerably eased and the process significantly accelerated. It is furthermore of advantage that the operating media that are respectively required are essentially transmitted via the multiple coupling element.

Another particular advantage of the measures according to the invention is that possible leakages in the cooling circuit, in particular in the area of the coupling device can be detected relatively early and easily. Also due to this fact, the danger of damages at the welding device, in particular at the control device of the welding unit or a production facility can be minimized.

Due to the measures according to the invention, an increased level of operator's safety and thus an increased level of functional reliability or facility availability is achieved. Since the coolant circuit or the coolant coupling has to be opened or detached consciously and active or separately by an operator or maintenance personnel, the danger of an undesired faulty operation or an unexpected discharge of coolant is reduced. Whereas a separation of the general coupling device for the electrical or gaseous operation media does not require special provisions, the separation of the coupling elements of the coolant coupling is at least bound to the previous deactivation or switch-off or shutoff of the cooling circuit. Additionally, due to a possibly expected loss or discharge of the cooling medium, in particular water, additional collecting measures or provisions for a possible refill of coolant can be made for reasons of precaution. Due to the separately embodied and spatially defined or separated coolant coupling, an increased consciousness raising with respect to the respective operating or maintaining person is achieved in any case.

Also the danger of sporadically appearing error sources regarding welding-related facilities is reduced nevertheless.

An optional further embodiment in which the other coupling element is embodied as a component of a plug connection for a coolant line is also advantageous, because on the one hand, a quick coupling or decoupling process for the at least one coolant line is possible. Additionally, the respective procedure is quasi intuitively recognizable for an operator, with the result that no lengthy training measurements or no particular technical knowledge is required to activate and deactivate the coolant coupling.

According to an advantageous further embodiment, the coolant coupling can be operated without tools. In this case, the advantage is that a quick assembly and, if applicable, also a quick detachment of the coupling device for the cooling medium is possible although the coupling device for the cooling medium is designed individually and has to be operated separately. In particular with industrial welding facilities or in connection with industrial welding robots, a quickest and easiest maintainability possible of the welding-related components is of increased importance.

Also an embodiment in which the other coupling element is arranged in an essentially dimensionally stable handle part or in the coupling element is of advantage, because thus the user friendliness and simultaneously also the connection quality or the connection safety can be increased. In particular by attaching a first coupling element of the coolant coupling device at or in the relatively inflexible end section of the hose assembly or within its coupling element, an even more reliable coupling connection can be created to a welding unit. Additionally, the connection process is thus considerably eased for an operator or a maintenance person.

Of particular advantage is also an embodiment, according to which the coupling element for the cooling medium is embodied to be a coupling bushing, which forms at least one coolant channel extending transversely to the longitudinal axis of the hose assembly. Thus, a feeding or drainage direction of the cooling media with respect to the hose assembly is principally orientated transversely or orthogonally to the coupling and decoupling direction for the other lines of the hose assembly or transversely to the plug connection of the multiple coupling device. In this way, the possibility of a wetting of the electrical connections or connection interfaces, which are preferably situated at the end face of the hose assembly, is reduced or kept to an minimum. Furthermore, the possibility of an entry of coolant into the hose lines provided for gaseous operating media, which are also led out at the end face of the hose assembly or provide an open and, is considerably reduced in an easy way.

An embodiment according to which the coupling system for the cooling medium is embodied as a coupling bushing integrated into the handle part of the hose assembly or integrated into the handle part of the coupling element of the hose assembly is furthermore of advantage, because in this way, a most stable and saved related to position localization of the coupling bushing is ensured. Furthermore, the handling convenience as well as the quality of the coupling connection to be established is increased. Additionally, the possibility of a disadvantageous distribution of possibly discharging coolant, varying depending on situation, within the hose assembly or within the multiple coupling device is reduced. In particular, possibly discharged cooling medium or cooling water can drain relatively easily or discharge from the coupling device or the hose assembly before consequential damages or breakdowns occur.

By the measures in which a visible area or a transition interface of the other coupling element is flush or approximately flush with the outer lateral surface of a handle part of the coupling element or is arranged lowered with respect to the outer lateral surface of the handle part, a particular compact coupling interface or a hose assembly composed in the slimmest possible way can be created. In particular, despite of a separately designed coupling device or coupling interface for the cooling medium, an according enlargement or expanding of the spatial dimensions, particularly of the maximum width or the diameter of the hose assembly or its coupling element is avoided. It is thus possible to insert the said hose assembly even under relatively limited space conditions without any problems. Despite of the separately embodied coupling device for the cooling medium, it is unproblematic to pass particularly the hose assembly or its terminating interface component in a manipulating arm of an industrial robot, in particular at least partially in hollow-shaft robots. The interface component or terminal section of the hose assembly facing away from the welding torch remains as slim as possible compared to conventional hose assemblies, although it offers an increased scope of technical functions.

An increased robustness and a better handling of the hose assembly is achieved by guiding the respectively required lines for the operating media in a protective hose extending between the handle part of the coupling element and the welding torch corresponding to an advantageous embodiment. Additionally, by the guiding of the at least one coolant line aside the other lines in the hose assembly, the danger of leakage in the cooling circuit is minimized. Additionally, the danger of an undesired breakaway of the at least one coolant line from the respective interface, in particular from the interface at the coupling bushing, is reduced.

An at least partial passing in relatively narrow channels or a pulling of the hose assembly in relatively tight hollow spaces, in particular in moving arms of industrial robots, can noticeably be eased by the feature of the handle part being designed to be cylindrical or approximately cylindrical and to have its maximum diameter adjusted to a feedthrough in a hollow-shaft robot.

Advantageous is also an embodiment in which the other coupling element or the handle part of the coupling element has at least one depression or at least one undercut, which is formed for a positive-locking, mechanical connection with a corresponding plug element, because thus the maximum width or the maximum diameter of the hose assembly in its end section facing away from the welding torch is not enlarged and nevertheless, a reliable coupling connection, which is secured against undesired decoupling, can be created. Additionally, the passing of the hose assembly in channels or hollow spaces such as arms of welding robots is thus advantaged, because there are no disturbing protrusions, which would cause jamming or gripping. Furthermore, thus the danger of damaging the coupling device itself or peripheral lines or elements in the region of the carrying channel is considerably reduced.

According to a advantageous embodiment, the hose assembly comprises at least one first coolant line for supplying the welding torch with a cooling medium and at least one further coolant line for discharging the heated cooling medium from the hose assembly, with the coupling element on the side of the hose assembly being embodied as combined coupling interface for the first and the other coolant line. Thus, a particularly efficient cooling of the welding torch or a particularly highly productive cooling device is created, though a high compactness of the coolant coupling is ensured. Additionally, lowest possible assembly or production times are achieved and the spare parts logistics or the stock-keeping is eased due to the constructional combined coupling interface for the two coolant lines.

The objective of the invention is furthermore provided by a plug element which includes at least one hollow-cylindrical pin element embodied for the gas and fluid proof transmission of a cooling medium with respect to a corresponding coupling element, and which includes at least one clip-lock element for the securing with respect to the coupling element. Due to these measures, a secure and reliable sealing effect on long-term basis between the plug element and a corresponding coupling element can be achieved. In particular, if the at least one hollow-cylindrical pin element is inserted at least partially into a thereto corresponding coupling bushing and thus a partial overlap between the pin element and the thereto corresponding coupling bushing is made, a reliable and robust coupling device is created. Furthermore, the coupling process is thereby eased, because the pin elements simultaneously serve as positioning elements, which clearly indicate or determine the correct relative position between the plug element and the corresponding coupling element.

Additionally, using one plug element having a first and another hollow-cylindrical pin element; each of which is allocated one respective feed and one respective return coolant line for a cooling medium, and/or having at least one connection piece for a coolant line, in particular for a feed line and a return line for coolant with respect to a coolant source or a welding torch, wherein the connection pieces can extend angled, in particular right-angled to the tube-shaped pin elements, and/or with the plug element being embodied block-like having wall sections opposite each other, the wall sections including one protrusion each for establishing a positive-locking connection with a corresponding coupling element, wherein the protrusions opposite each other can be embodied at spring-mounted clip-lock elements, wherein the plug element can also be embodied in a continuingly or abruptly expanding way from the free end sections of the at least one pin element with respect to the axial direction of the at least one pin element, so that it has an approximately V-shaped outer contour or at least a protruding collar, and wherein the plug element is embodied symmetrically with respect to its connection interface to a corresponding coupling element being embodied as a coupling bushing, so that it can be coupled with a corresponding coupling bushing in at least two orientations differing in 180° that can be selected freely, at least one of the previously described technical effects and advantages can be achieved.

Regardless of the previously described hose assembly and regardless of the previously described coupling element, the objective of the invention is provided by a plug connection within a cooling circuit between a coolant source and a welding torch, the plug connection including a plug element and a corresponding coupling element, the corresponding coupling element being integrated in a coupling element of a hose assembly and the plug element being detachably connected to the corresponding coupling element via a clip-lock element and being detachably mounted at the coupling element of the hose assembly. Technical effects and advantageous properties that can thereby be achieved can be taken from the preceding description, in particular from the statements concerning the advantages and effects of a hose assembly and a coupling device as already described.

According to an advantageous embodiment, the coolant coupling is designed as a plug connection coupling and is provided for a connection, which can optionally be activated or deactivated, between a coolant source arranged on a welding unit or a separately arranged cooling unit and a hose assembly. Thereby, a quick and simultaneously unproblematic assembly of the coupling connection or a simple deactivation of an existing coupling connection for the cooling medium is achieved. The respectively required handling is in this case nearly intuitively recognizable also for a technically inexperienced group of people, with the result that in case of a required detachment of activation of the cooling circuit, usually no difficulties arise. In particular, special trainings will not be necessary and special notes for users can be minimized.

By the measures of a plug connection having a clip-lock element with one or more protrusions as described herein, a clip-lock connection that can easily and quickly be activated and deactivated between the two coupling elements of the coolant coupling device can be created. The allocation of the clip-lock protrusion to the plug element and the allocation of the undercut or recess, which can, together with the clip-lock protrusion, be put in a mechanical interaction, with the coupling element on the side of the hose assembly, has the advantage that the coupling element on the side of the hose assembly is as robust as possible and relatively insensitive against mechanical strains, which occur for example during the passing of the hose assembly. The plug element with the clip-lock protrusions is subject to lower, mechanical strains and can be exchanged considerably easier and more inexpensive, if applicable.

Advantageous is thereby a further embodiment of the plug connection in which two spring-mounted clip-lock elements are situated diametrically opposite at the plug element, since thus a comfortable handling of the coolant coupling device is ensured and additionally an automatic securing of an active coupling connection is effected, so that securing measures to be additionally or separately performed are unnecessary.

According to an advantageous embodiment, the coupling element on the side of the hose assembly is embodied as a coupling bushing. Thereby a plug-bushing-system is designed, which best meets the requirements in terms of high impermeability, an adequate robustness and an easy or intuitive handling.

Of advantage are also measures in which a visible area or a transition interface of the other coupling element is flush or approximately flush with the outer lateral surface of a handle part of the coupling element or is arranged lowered with respect to the outer lateral surface of the handle part, because thereby the second, plug-like coupling element can be embodied as compact or slim as possible. In particular, hook-shaped protruding components at the coupling element on the side of the hose assembly are thus omitted, so that the pulling or the passing of a hose assembly, provided with the said coupling element, is considerably eased.

By measures of the coupling element of the hose assembly, the coupling element corresponding with the plug element, and a hose assembly together forming an integral, structurally combined unit, a connected structural unit is created, which best possibly minimizes the effort of installation or assembly in terms of the connection to a welding unit. Additionally, the probability of installation errors or of incomplete assemblies can be reduced due to the constructional combination of the said components.

Of particular advantage are also the measures for the plug connection, wherein a coupling and decoupling direction between the plug element and the corresponding coupling element are aligned transverse to the coupling and decoupling direction of the coupling element of the hose assembly, since thereby the probability of a wetting of electrical contact points of directly adjacent coupling elements for operating media or the danger of an electrical short circuit is reduced with simple but efficient measures, also in the event of an unexpected discharge of coolant in the region of the coolant plug connection.

It is particularly of advantage if the coupling and decoupling direction between the plug element and the coupling element of the coolant coupling is orientated transversely to the longitudinal axis of the hose assembly, because thereby the logical separation of the respective coupling connections exists not only in terms of construction but also with respect to the manner of operation. Furthermore, the probability of an overtopping of a particularly fluid coolant onto the interfaces for the electrical or gaseous operating media, for example during an assembling or disassembling process of the hose assembly or the welding torch, is reduced. As a result, the danger of damages or of short circuits is minimized or additional efforts concerning time and cost for cleaning or drying work are unnecessary.

Additionally, a plug connection, with the first coupling element as described herein and with a plug element as described herein, has the at least one of the technical effects or advantages as they were described herein for the coupling element and for the plug element.

Finally, a welding device with a welding unit and a welding torch optionally detachably connected thereto via a hose assembly and via a coupling device as described herein offers at least one of the previously described technical effects and advantages.

In order to facilitate a better understand the invention, this is more clearly explained by means of the following figures.

Figure 2:
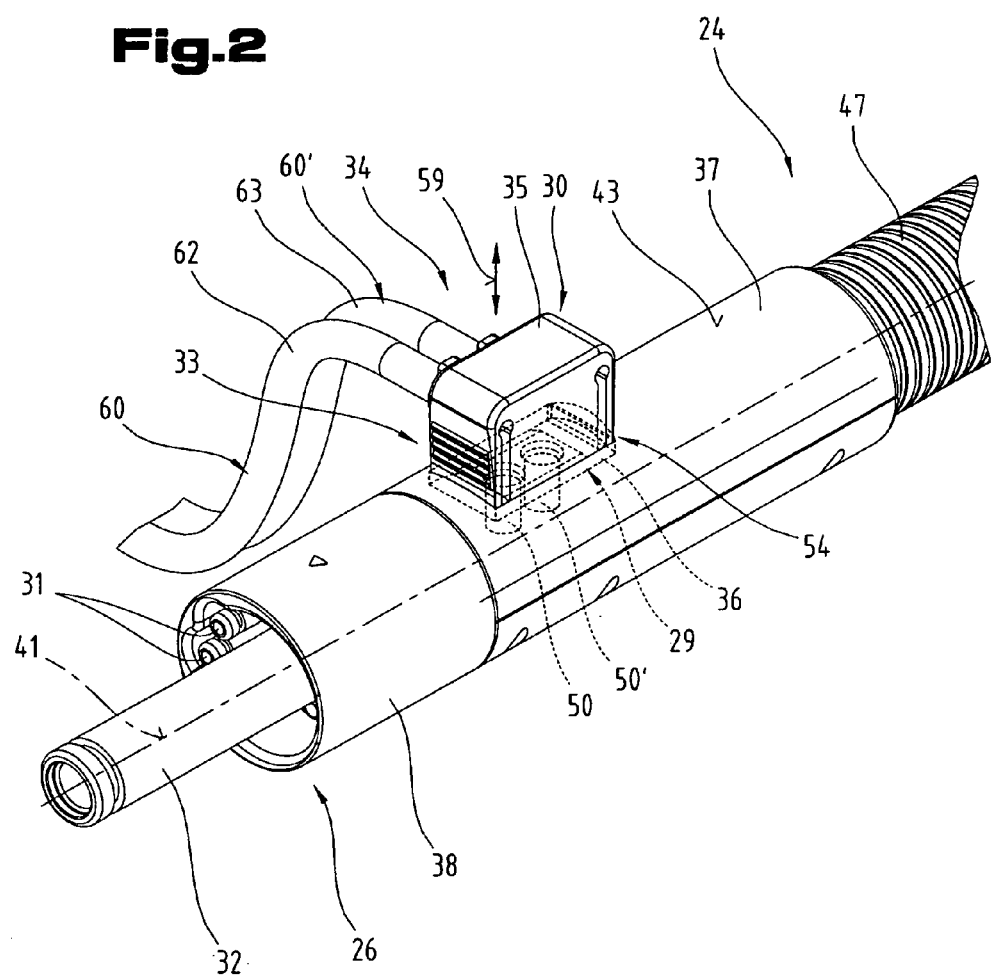
Figure 3:
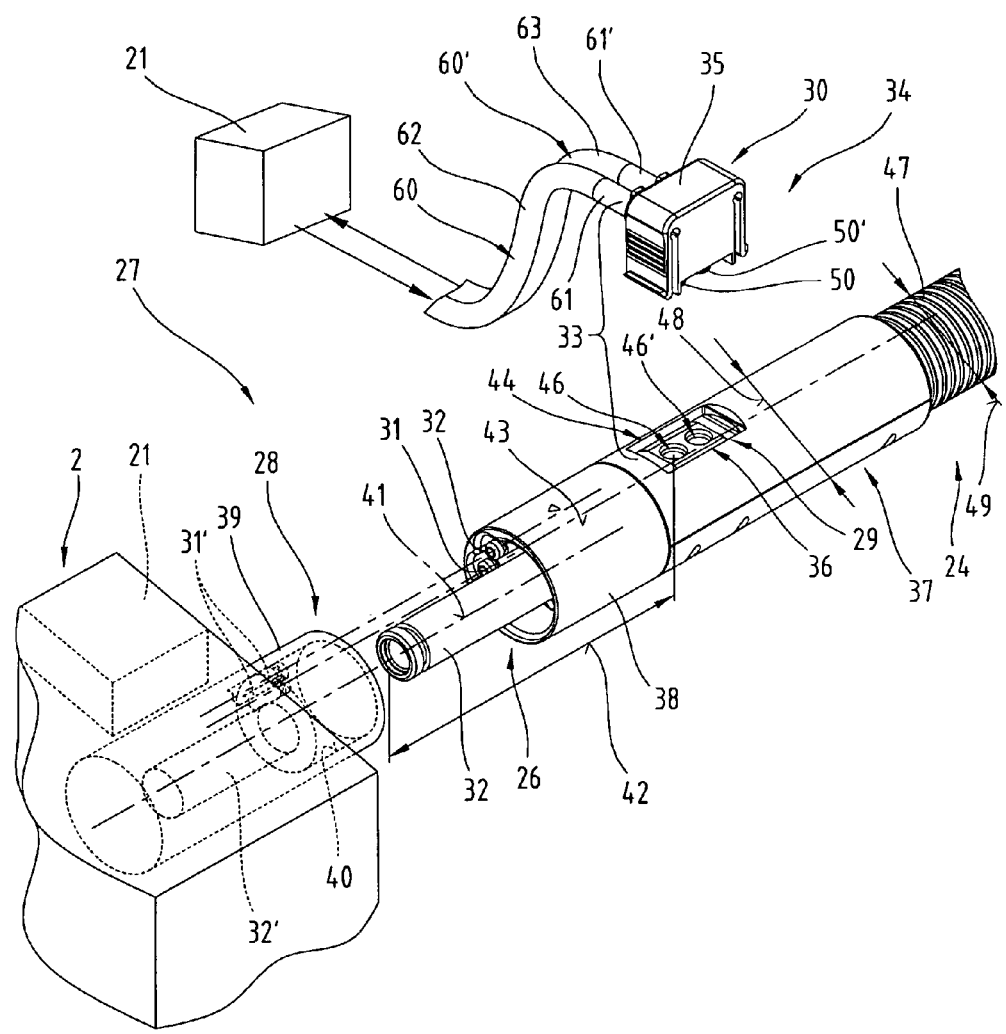
Figure 4:
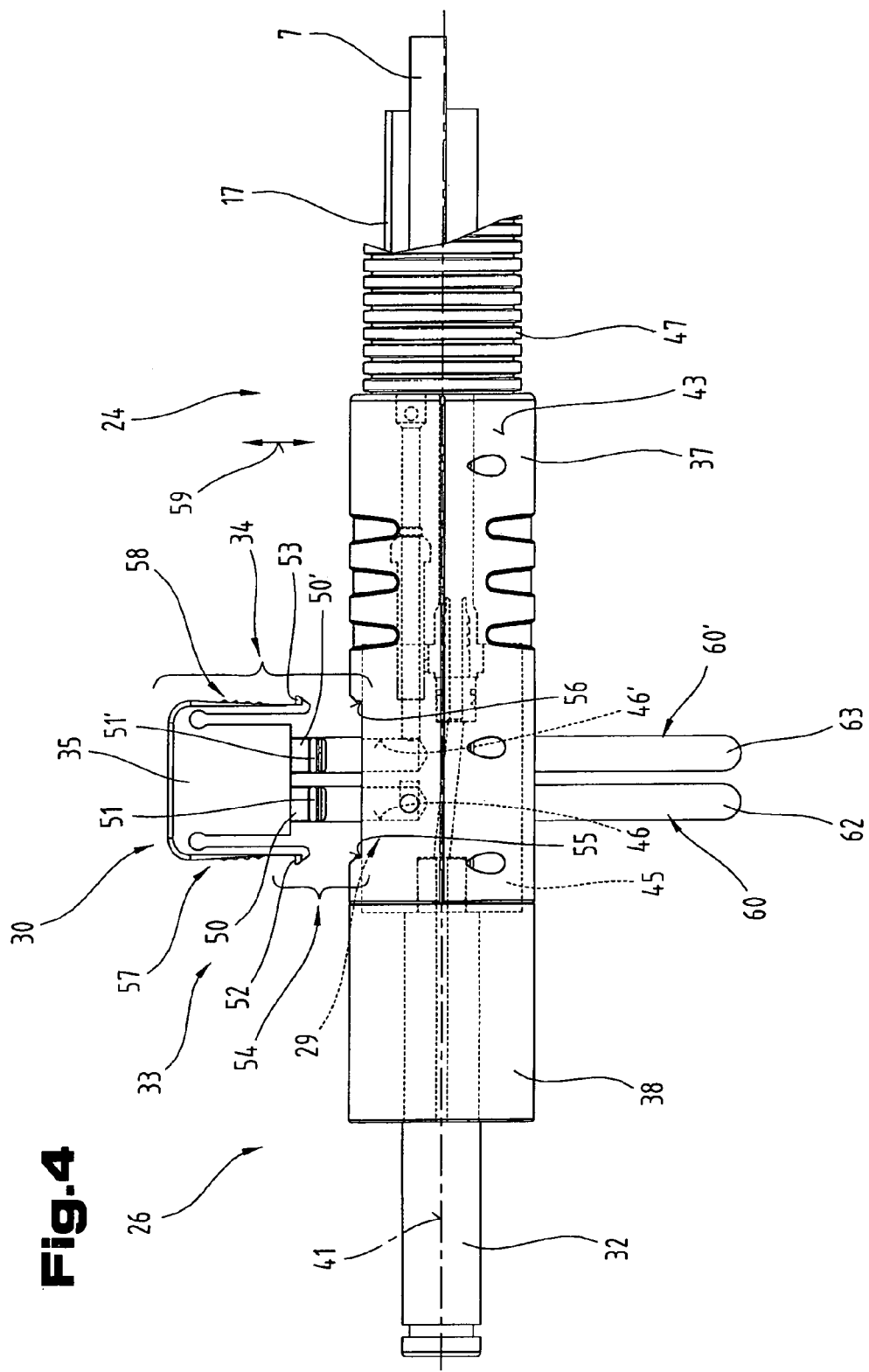

The heavily simplified schematics show:

FIG. 1 an exemplary form of embodiment of a welding device comprising a welding torch, which is connected to a welding unit by a hose assembly and a multiple coupling device as well as a separately embodied coolant coupling device;

FIG. 2 a section of the hose assembly in the terminal section with the multiple coupling device and the coolant coupling device during the actively coupled state of the coolant coupling device in perspective view;

FIG. 3 the multiple coupling device according to FIG. 2 in decoupled state of the coolant coupling device in connection with a corresponding coupling element at a welding unit;

FIG. 4 a side view of the multiple coupling device according to FIG. 3;

FIG. 5 a side view of the multiple coupling device according to arrow V in FIG. 4;

FIG. 6 the multiple coupling device according to FIG. 2 in side view, during the active state of the coolant coupling device;

FIG. 7 the multiple coupling device according to FIG. 6 with inactive coolant coupling device;

FIG. 8a-8d the plug element of the coolant coupling device in different views.

It must first be stated that in the various embodiments described, identical parts have been marked with the same reference identifiers and the same parts descriptions. It is therefore possible to transfer the disclosures contained in the overall description to the identical parts with the same reference identifiers or the same parts descriptions. The selected positioning terms are used in the description, such as top, bottom, side etc., which refer directly to the described and the depicted figures and which can be correspondingly transferred to the new position in the event of a change in position. Furthermore, individual characteristics or combinations of characteristics from the various embodiments shown and described can present independent or inventive solutions, or solutions according to the present invention.

In FIG. 1, an exemplary embodiment if a welding device 1 or a welding facility for performing diverse welding processes is shown. This schematically shown welding device 1 is designed for MIG/MAG welding processes and the following described invention also being applicable for welding devices for WIG welding, stick electrode welding, double-wire tandem welding or other welding processes, with which high temperatures in the region of the welding joint appear and a cooling of the welding torch is useful.

Depending on its genre or the welding process to be performed, the respective welding device 1 comprises at least one of the following described components. The main component of the welding device 1 is formed from a welding unit 2, which directly or indirectly provides or regulates the welding energy and the other operating media necessary for the welding process. The welding unit 2 thus comprises at least one power element 3, which among others provides the electrical welding energy and a control device 4 for open loop controlling or closed loop controlling the welding process or the respective relevant process parameters.

If the welding device 1 is embodied as a MIG/MAG welding device, at or in the welding unit 2, comprising a housing 5 substantially closed off relative to the outside, a valve 6 that can be electrically controlled is embodied, which is flow-connected with at least one hose-like line 7 for a welding gas 8, particularly a protective gas, e.g. $CO_2$, helium, or argon or which is arranged between a gas tank 9 and a welding torch 10. The valve 6 for controlled provision of welding gas 8 in the area of the welding process is controlled via an appropriate operating element, which is usually embodied at the welding torch 10 with hand-held welding torches and is put in an fluidic closed or open state either directly by the operating or start element or indirectly by the control device 4.

Additionally, the welding device 1 can comprise a wire feed device 11, which can either be embodied as an integral component of the welding unit 2—as shown—or as a constructional individual component. By means of the wire feed device 11, a fusing wire-shaped electrode serving as an additional material for the welding connection to be established is delivered to the welding torch 10, in particular the welding process. Especially for the MIG/MAG welding, a wire feed device 11 is provided and an additional material, in particular a welding wire 13 is delivered from a delivery spool 14 or a welding wire spool into the region of the welding torch 10 via at least one hose- or spiral spring-like line 12. It is of course also possible not to integrate the wire feed device 11 into the housing 5 of the welding unit 2 but to form it as an constructional individual accessory.

It is also possible that at least one component of the wire feed device 11 is arranged in the welding torch 10 and a fusing welding electrode is delivered from the welding torch 10 to the welding process. It is also possible that the welding torch 10 has a non-fusing electrode and an additional material, in particular a fusing welding electrode is delivered manually, as it is common with WIG welding.

The electrical current for building and maintaining an arc 15, in particular a welding arc between the fusing or non-fusing electrode and a workpiece 16 is delivered to the welding torch 10, in particular the electrode, from the welding unit 2 or its electrical power element 3 via at least one welding-current line 17. The workpiece 16 to be welded which is usually formed from several parts to be welded, is also connected with a welding device 1, in particular with the electrical power element 3 in the welding unit 2, by one additional welding-current line 18. One of the two welding-current lines 17, 18, in particular the line 18 for transmitting the welding current earth, is usually formed as a structurally individually or separately guided electrical line.

Via these welding-current lines 17, 18 conducted to the welding torch in a combined or separated manner each, the electrical energy required for building or maintaining the arc or plasma beam for the welding or cutting process is delivered to the welding process.

As previously described, depending on the welding method or the welding process to be performed respectively, a number of lines 7 and/or 12 and/or 17, 18 are required to be able to provide the welding torch 10 with the respectively required operating media, such as welding current, welding wire and/or protective gas. Frequently, at least one data or control line is required, which can be used to transmit control or supervision signals between the welding torch 10 and the welding unit 2 and vice versa, if applicable.

In case of the embodiment according to the invention, the welding torch 10 is actively cooled, in order to keep its thermal stress as low as possible and to obtain positive effects with respect to the maximum possible action time without interruptions or achieve positive results with respect to the welding process to be performed. Furthermore, this active cooling can in particular represent a considerable gain in terms of comfort and security, particularly with handheld welding torches 10. In contrast to the passively cooled welding torches, particularly welding torches that are cooled by ambient air, it is unproblematic to achieve a duty-cycle or operating time of 100% with actively cooled welding torches 10, whereas with air-cooled welding torches or those which are cooled by ambient air, the maximum duty-cycle is frequently reduced and meanwhile cooling phases without welding operations are recommended or required. Thus, the welding device 1 comprises at least one coolant line 19 at least for supplying the cooling medium to the welding torch 10. As a cooling medium, water or other water-based coolants are preferably used.

Preferably, a closed coolant circuit 20 is embodied, which comprises at least one inlet coolant line 19 and at least one outlet coolant line 19'. In this case, a preferably fluid cooling medium is delivered to the welding torch 10 via the inlet coolant line 19, and this cooling medium absorbs a part of the thermal energy emitting in the region of the welding torch or cools the welding torch, in particular its penstock or front section. The correspondingly heated cooling medium is then discharged from the welding torch 10 via the outlet coolant line 19'. This means that the welding torch 10 is preferably involved into a cooling circuit 20 comprising a cooling medium and a corresponding coolant source 21 provides the cooling medium. This coolant source 21 providing the cooling medium can be arranged in the welding unit 2 or can be embodied as a structurally individual cooling unit.

The at least one coolant line 19, 19' connects the welding torch 10 with the coolant source 21 or the cooling unit and provides for sufficient cooling or a thermal transfer from the welding torch 10 to the coolant source 21 or the cooling unit; thus ensuring an appropriate temperature control of the welding torch 10. A temperature control can be allocated to the coolant source 21 or the welding torch 10, which helps to keep determined sections of the welding torch below an upper temperature threshold or within a predetermined temperature range.

Instead of embodying a cooling circuit 20, it is particularly with welding torches 10 that are actively cooled by gas or air also possible, to provide only a coolant line 19, which delivers the coolant from the coolant source 21, such as a fan or an air bottle, to the welding torch 10. The heated, gaseous coolant can then discharge in the surrounding region of the welding torch 10 or can be guided into the periphery via a catching device, such as an exhaust hood.

Thus, the respective coolant source 21—as schematically shown—can represent an integral component of the welding torch 10 or the welding unit 2 or can alternatively be formed from a separately arranged cooling unit that provides the appropriate cooling power for the welding torch 10. The respective coolant source 21 or the respective cooling unit provides the appropriate cooling energy and transmits the cooling medium to the welding torch via the at least one coolant line 19, 19'. According to embodiments known from prior art, also not shown valves, expansion tanks, sensors, heat exchanger and/or pumps can be implemented in the closed cooling circuit 20 or in a unidirectional coolant transmission path.

According to an advantageous embodiment of the cooling device or the coolant source 21, a fluid tank 22, in particular a water reservoir can be provided, which keeps the cooling medium, in particular the cooling water on hand. The coolant is delivered from the coolant source 21 to the welding torch 10 by means of a not shown conveyor for the coolant, in particular a liquid pump. When the welding device 1 is put into operation or when the welding process, which can be effected by at least one operating element provided at the welding torch 10, is started, the coolant source 21 or the cooling circuit 20 is usually activated directly or time-shifted and then a cooling or a temperature control of the welding torch 10 is effected. An activation of the cooling device for the welding torch 10 can also be effected as required, in particular depending on temperature. The cooling device or the coolant source 21 or the cooling unit can be formed according to any embodiment known from prior art and e.g. also comprise a heat exchanger for discharging the absorbed thermal energy or for cooling and purifying the cooling medium. As a result, also at least one flow indicator or temperature sensor can be provided, which can be used to control or regulate the cooling power or the cooling function of the coolant source 21.

As known per se, the welding device 1 provides at least one input and/or output device 23, 23', which can be used to adjust or select the diverse welding parameters, operating modes or welding programmes of the welding device 1. The input and/or output device 23, 23' can in this case be allocated to the welding unit 2 or the welding torch 10. The welding parameters, operating modes or welding programs adjusted or adjustable by means of the input and/or output device are transmitted to the control device 4 for processing or realization. The respective adjustments are transmitted from the control device 4 to the respective components of the welding facility or the welding device 1 or these components are correspondingly selected with the result that appropriate required values in terms of control and regulation are achieved. In the case of an industrial welding facility, in particular a welding facility in connection with industrial robots, also a peripherally embodied open and closed loop control device can be provided.

Basically, it is stated, that for different welding methods or welding devices 1, such as WIG devices, MIG/MAG devices or plasma devices, not all of the above mentioned components have to be used or inserted. Depending on the required operating media in the region of the welding joint, for example welding current, welding wire, protective gas and/or control signals, at least one appropriate hose assembly 24 is connected to the welding device 1 or the welding unit 2 and the hose assembly 24 integrally combines several lines, such as the line 7 for a welding gas 8, the line 12 for an fusing electrode or a welding wire 13, the at least one welding-current line 17 and/or the at least one electrical control line 25, and guides them to the welding torch 10.

In addition to the diverse, respectively required lines 7, 12, 17 and/or 25, structurally combined to be a common hose assembly 24, the hose assembly 24 furthermore comprises the at least one coolant line 19, 19' for supplying and/or removal of a cooling medium with respect to the welding torch 10. The at least one coolant line 19, 19' is preferably guided in the hose assembly 24 or at the hose assembly 24 and serves as a medium for transmission for the preferably liquid coolant between the coolant source 21 or the welding unit 2 and the welding torch 10. The diverse, respectively required lines for the transmission of the respectively required operating media and at least one line for transmitting the coolant are thus provided in the hose assembly 24.

At its end facing away from the welding torch 10, the hose assembly 24 has at least one multiple coupling element 26. This multiple coupling element 26 is provided for the optionally detachable connection of several lines 7; 12; 17 and/or 25, which transmit electrical signals or energy and/or gas, of the hose assembly 24 with the welding unit 2 or the corresponding current source unit. This multiple coupling element 26 can in this case be formed as a screw coupling or plug-in coupling and represents a means of coupling for common coupling and decoupling of several electrical lines 17; 25 and/or a protective-gas line 7 with respect to the welding unit 2. By means of this multiple coupling element 26, preferably the line 7 for a welding gas 8, the line 12 for delivering of a welding wire 13, at least one electrical control line 25 and at least one welding-current line 17 are optionally connected or detached with respect to the welding unit 2, with these mentioned lines being integrally combined to be an hose assembly 24. The welding torch 10 is usually permanently connected with the second or opposite end of the hose assembly 24. The welding torch 10 can usually only be detached by disassembling the welding torch 10 from the hose assembly 24.

The multiple coupling element 26 at the end of the hose package 24 facing away from the welding torch 10 represents a component of a coupling device 27, which is provided for connecting the hose assembly 24 with a welding unit 2, as it can exemplary be seen in FIG. 1. Additional to the multiple coupling device 26 on the side of the hose assembly, at least one corresponding multiple coupling element 28 on the side of the welding unit is embodied. The mutually corresponding multiple coupling elements 26, 28 make up a multiple coupling device 27, which can be used to establish an optionally detachable connection of the hose assembly 24 or the welding torch 10 with respect to the welding unit 2. The two coupling elements 26, 28 of the multiple coupling device 27 are in this case embodied according to a mutually corresponding plug-bushing system. A general multiple coupling device 27 for electrical energy and/or electrical signals or the lines carrying welding gas between a welding torch 10 or a hose assembly 24 and a welding unit 2 is known per se. Such general multiple coupling devices 27 are either embodied as a screw coupling or plug-in coupling, with a securing of an active coupling connection frequently being effected by means of a screw coupling, in particular by means of a union nut. The securing of an active coupling state between the two multiple coupling elements 26, 28 can be effected according to an advantageous embodiment but also by a clamping device, which can be activated or deactivated by means of a lever clamping element.

It is substantial that, additional to the multiple coupling element 26, another coupling element 29 is embodied in a structurally separated and individual manner at the end of the hose assembly 24 facing away from the welding torch 10. This coupling element 29 is provided for an optionally detachable connection of the at least one coolant line 19, 19' of the hose assembly 24 with a coolant source 21 arranged in the welding unit 2 or with a separately arranged cooling unit. This additional or separately embodied coupling element 29 can in this case be coupled and decoupled independently from the state of the coupling of the multiple coupling element 26. This means that at the hose assembly 24, a separately designed or separately operable coupling element 29 is embodied, which can be used to optionally connect the at least one coolant line 19, 19' of the hose assembly 24 with the coolant source 21 and can optionally be detached with respect to the coolant source 21, without causing or requiring an modification of the coupling state of the multiple coupling element 26.

Additional to a first coupling element 28 on the side of the welding unit and a coupling element 26 on the side of the hose assembly, the corresponding coupling device 27 between the hose assembly 24 and the welding unit 2 comprises also a third coupling element 29 as well as a thereto corresponding, fourth coupling element 30. The third and fourth coupling element 29, 30 mutually corresponding with each other is provided for an gas- and waterproof transmission of a cooling medium between the coolant source 21 arranged in the welding unit 2, or alternatively, between a separately arranged cooling unit and the hose assembly 24 or welding torch 10. It is in this case essential that the third and fourth coupling element 29, 30 are embodied for the transmission of the cooling medium, independent from the coupling state of the first and second coupling element 28, 26 that means, independent from the multiple coupling device 27 and that they can be coupled and detached from each other, if necessary.

As it can best be seen in FIG. 3, the each of the first and second coupling elements 28, 26 of the multiple coupling device 27 comprises a number of corresponding connection interfaces 31, 31' and 32, 32', which are embodied to transfer or transmit physically differing operating media between the first coupling element 28 and the second coupling element 26 and vice versa, as soon as the first and the second coupling element 28, 26 are in a correctly coupled state. In this case, the mutually corresponding connection interfaces 31, 31' are for example formed from pen- or bushing-like connection elements for transferring or transmitting gaseous media, such as welding current or compressed air. The at least one additional connection interface 32, 32' is according to the example provided for the transfer or transmission of the welding current from the first current element 28 in the direction of the second coupling element 26. In this case, the welding-current connection interface 32 at the second coupling element 26 is embodied as a massive contact pen, approximately as thick as a finger, and thornlike projects from the end face of the hose assembly 24. The thereto corresponding connection interface 21' on the side of the welding unit is formed from an electrical contacting bushing in which the pen-like connection interface 32 can be inserted and can then be clamped in a force-locking manner in the connection interface 32' embodied as a lock bush. Thus, a reliable and most extensive possible contacting of the pen- or pin-like connection interface 32 and the bushing-like connection interface 32' is established, with the result that also the transmission of higher currents, in particular higher welding currents is possible, and excessive heatings of the contact points do not arise.

It is essential that the third and the fourth coupling element 29, 30 form a structurally separately embodied coolant coupling 33, which can be optionally activated, in particular coupled, or deactivated, in particular detached, independent from the multiple coupling device 27 for the diverse operating media of the welding torch 10. Thereby, the fourth coupling element 30 is embodied to be the first component of a coolant coupling 33, which can preferably be operated without tools, and is provided for an optionally detachable connecting of the at least one coolant line 19, 19' in the hose assembly 24 with a coolant source 21, which is either integrated or arranged in a separated manner, or with an appropriate cooling unit.

As it can best be seen in FIG. 3, the fourth coupling element 30 and the third coupling element. 29 preferably form a plug connection 34, which is designed to optionally activate and detach the connection between a coolant source 21 arranged in the welding unit 2 or a separately arranged coolant source 21 or a separately arranged cooling unit and the hose assembly 24 or its welding torch 10. The fourth coupling element 30 represents a component of the plug connection 34 and is, in the correctly coupled state, embodied to transmit fluid cooling media and is embodied like a plug, in this case. The third coupling element 29 of the coolant coupling 33 or of the plug connection 34, situated on the side of the hose assembly is in contrast formed from at least one coupling bushing 36, which is formed corresponding with respect to the plug element 35. This coupling bushing 36 is arranged at the end section of the hose assembly 24 facing away from the welding torch 20.

According to an advantageous embodiment, the third coupling element 29 is arranged at or in an essentially dimensionally stable handle part 37. This handle part 37 represents an operating handle, which can be used to quickly and easily couple and decouple the hose assembly 24 with respect to a welding unit 2. The handle part 37 is preferably formed from a component of the coupling element 26 on the side of the hose assembly. The handle part 37 can particularly be designed as an element in the form of a sleeve, which simultaneously serves as a guide body 38 between the first and the second coupling element 26, 28. According to an advantageous embodiment, the handle part 37 is designed to be a hollow-cylinder and the end section of the handle part 37 facing away from the welding torch 10 forms a bushing-shaped guide body 38, which cooperates with a corresponding guide body 39 at the welding unit 2 or at the first coupling element 28. The hollow-cylindrical guide body 38 of the second coupling element 26 can in particular be inserted into another hollow-cylindrical guide bore 40 at the first coupling element 28. The guide bodies 38, 39 corresponding with each other at least partially absorb forces extending transverse to the longitudinal axis 41 of the hose assembly 24 or the coupling device 27 and arrange thus for an adequate mechanical strength of the multiple coupling device 27.

The coupling bushing 36 of the coolant coupling 33 is preferably built into the handle part 37 of the hose assembly 24 or the second coupling element 26. This means that the coupling bushing 36, the handle part 37 and the second coupling element 26 in connection with the hose assembly 24 form an integral, structurally combined unity, as it can best be seen in FIG. 3. In particular the third coupling element 29, designed to be a coupling bushing 36, is structurally combined with the second coupling element 26, so that an one-piece structural unit that can only be separated by disassembly is formed, as it can best be seen in FIG. 3. The third coupling element 29, in particular the coupling bushing 36 of the coolant coupling 33 is in this case arranged relatively close to the multiple coupling element 26, in particular in the end section of the hose assembly 24 facing away from the welding torch 10. The connection interfaces 31, 32 of the multiple coupling element 26 are in this case arranged at the end face of the hose assembly 24 or at the end face of its handle part 37. The connection interfaces 31, 32 particularly form the endings of the respective lines 7; 12; 17; 25 which face away from the welding torch 10 or are arranged at the end face and serve for the several operating media. The at least one transition interface 44 at the coupling bushing 36 is in contrast embodied for the transmission of a cooling medium at the lateral surface or essentially parallel to the lateral surface of the hose assembly 24 or the handle part 37. This means that the bushing-like coupling element 29 for a cooling medium is embodied structurally separated and integrated into the multiple coupling element 26 of the hose assembly 24, with the connections of the coupling element 26 and the coupling element 29 being arranged at a distance, as it can be seen at least in FIGS. 2 to 5. A distance 42 between the second and the third coupling element 26, 29 measured in longitudinal direction of the hose assembly 24 is in this case less than 50 cm, in particular circa 10 cm.

The coupling bushing 36 is here positioned in such an advantageous manner that it does not protrude beyond a lateral surface 43 of the handle part 37, with the lateral surface 43 being preferably embodied to be cylindrical or approximately cylindrical. The coupling bushing 36 of the coolant coupling 33 is particularly arranged in the handle part 37 in an integrated or lowered manner. According to an advantageous embodiment, a visible area or the transition interface 44 of the coupling bushing 36 is arranged flush or approximately flush with the outer lateral surface 43 of the handle part 37. According to a preferred embodiment, the transition interface 44 of the coupling bushing 36 is arranged in a lowered manner with respect to the outer lateral surface 43 of the handle part 37, as it can best be seen in FIG. 3. This means that, despite of the coupling bushing 36, being arranged structurally separated, at the hose assembly 24 or at its handle part 37, there are no parts protruding or projecting from the handle part 37 or the hose assembly 24 as soon as the coolant coupling 33 is deactivated according to the drawing in FIG. 3. The plug element 35 in contrast protrudes from the lateral surface 43 of the hose assembly 24 or its handle part 37 if the coolant coupling 33 is activated, as it can be taken from FIG. 3.

According to an advantageous embodiment, the coupling bushing 36 is embodied as an integral component of a connection block 45 of the second coupling element 26—see FIG. 6, 7. At this connection block 45 within the handle part 37, several lines 7 and/or 12 and/or 17 and/or 25 of the hose assembly 24 are connected or retained. In this case, the connection block 45 quasi represents the terminal piece for several lines 7; 12; 17; 25 guided in the hose assembly 24 and preferably for the at least one coolant line 19, 19'. This connection block 45 is preferably made of a metallic material, particularly brass and has a number of bores or connection ably made of a metallic material, particularly brass and has a number of bores or connection points for the several lines 7; 12; 17; 25 and for the coolant lines 19, 19' in the hose assembly 24.

The coupling bushing 36 on the side of the hose assembly forms at least one coolant channel 46, 46' extending transverse to the longitudinal axis 41 of the hose assembly 24. This, at least singly but preferably doubly embodied coolant channel 46, 46' end in the respective coolant line 19, 19' within the hose assembly 24. This means that, by means of two coolant channels 46, 46', the coupling bushing 36 establishes separated flow connections to the respective coolant lines 19, 19'. According to an advantageous embodiment, at least a first coolant line 19 for feeding a cooling medium to the welding torch 10, i.e. a so-called coolant feed line, and at least one additional coolant line 19' for removal of the heated cooling medium from the hose assembly 24, i. e. a so called return line, is embodied in the hose assembly 24. In this case, the third coupling element 29 preferably represents a structurally combined coupling interface for the first and another coolant line 19, 19'.

According to an optional embodiment, as it was adumbrated by means of dashed lines in FIG. 1, the multiple coupling device 27 comprising the coupling elements 26, 28 corresponding with each other, can also be embodied between the welding torch 10 and an ending of the hose assembly 24 allocated to the welding torch 10. At each of its both endings, the hose assembly 24 can thus have one respective connection coupling, which is preferably defined by one coupling element 26 each, in each of which one additional coupling element 29 for the cooling medium is integrated. The plug element 35 for the at least one coolant line 19, 19' of the welding torch 10 which corresponds with the coupling element 29 is in a case like this allocated to the welding torch 10. According to this embodiment, the hose assembly 24 has at both ends multiple coupling element 26 with a quasi laterally integrated coupling element 29 which is preferably designed to be bushing-shaped.

The at least one coolant line 19, 19', particularly the feed and return line for the cooling medium, as well as the lines 7; 12; 17; 19 for the operating media preferably extend in a protective hose 47 extending between the handle part 37 and the welding torch 10. Said protective hose 47 is on the one hand connected with the welding torch 10 and on the other hand with the handle part 37 of the second coupling element 26. This protective hose 47 combines the diverse lines 7; 12; 17; 25 for the operating media and the at least one coolant line 19, 19' in one line package and similarly represents the protective cover for the line connections led therein.

The lateral surface 43 of the handle part 37 is preferably embodied in a cylindrical or approximately cylindrical manner. It is thereby of advantage if the handle part 37 has a maximum diameter 48 or a maximum width of 50 mm, preferably circa 40 mm. An outer diameter 49 of the protective hose 47 is in this case equal to or slightly smaller than the diameter 48 of the handle part 37. The protective hose 47 is particularly inserted into the hollow-cylindrical handle part 37 and the inner lateral areas of the handle part 37 hold in position in a secure way in terms of being stripped.

As it can best be seen in the FIGS. 4 to 7, the fourth coupling element 30 being formed as a plug element 35 has at least one hollow-cylindrical pin element 50, 50'. This at least one hollow-cylindrical pin element 50, 50' is provided for the gas and fluid proof transmission of a cooling medium from the plug element 35 in the direction of the coupling bushing 36 and vice versa. A diameter of the at least one pin element 50, 50' is here such dimensioned that the latter can be inserted into the respectively allocated coolant channel 46, 46' of the coupling bushing 36. In the end section facing away from the plug element 35 of the at least one pin element 50, 50', at least one annular sealing element 51, 51', particularly a so-called O-ring, is arranged, in order to allow to establish a sufficiently gas and fluid proof connection between the pin elements 50, 50' and the coolant channels 46, 46' that are preferably embodied in pairs. According to an advantageous embodiment, the feed as well as the return coolant line 19, 19' in the hose assembly 24 is optionally coupled and decoupled with respect to a cooling unit or a coolant source 21 by means of only one plug element 35. Thus, a particularly quick and simultaneously very failsafe handling is achieved.

As is can best be taken from the comparison of the FIGS. 6 and 7, at the plug element 35 of the coolant coupling 33, at least one protrusion 52, 53 is embodied, which is provided for the establishment of the optionally detachable, mechanical clip-lock connection 54—FIG. 6. In particular, the at least one protrusion 52, 53' can be optionally connected and detached in a positive-locking manner with an at least one corresponding undercut 55, 56 at the third coupling element 29 or at the handle part 37 if the hose assembly 24. In particular, due to the at least one clip-lock connection 54, a securing of an established coupling connection between the plug element 35 and the coupling bushing 36 is ensured, so that undesired, e.g. pressure-related, separations of the coolant coupling 33 are excluded.

According to an advantageous embodiment, the at least one protrusion 52, 53 is formed from two clip-lock elements 57, 58 that are spring-mounted and arranged diametrically opposed at the plug element 35. The protrusions 52, 53 at the endings of the spring-mounted clip-lock elements 57, 58 facing away from the plug element 35 engage the at least one undercut 55, 56—FIG. 6—when the third and the fourth coupling element 29, 30 are in a correctly coupled state, and thus avoid an undesired separation of the coupling connection of the coolant coupling 33. For detaching an active coupling connection between the coupling elements 29, 30, only the diametrically opposed clip-lock elements 57, 58 are approximating each other counter their spring-effect and then, the plug element 35 can be detached or removed from the coupling bushing 36—FIG. 4.

A coupling and decoupling direction—arrow 59—between the third and the fourth coupling element 29, 30 extends transverse to the coupling and decoupling direction of the first and second coupling element 26, 28 or transverse to the longitudinal axis 41 of the hose assembly 24. This means that, compared to the coupling and decoupling direction—arrow 59—of the coolant coupling 33, the coupling and decoupling direction of the multiple coupling device 27 are arranged orthogonally to each other or extend perpendicularly to each other. The coupling and decoupling direction—arrow 59—of the coolant coupling 33 is particularly aligned radially to the cylindrical or approximately cylindrical lateral surface 43 of the handle part 37.

Instead of the previously describe coolant coupling 33, which is formed to be a plug connection 34, it is also possible that the third and the fourth coupling element 29, 30 are embodied as components of a screw connection coupling, with the fourth coupling element or the coupling element on the side of the cooling unit comprising a union nut, which can optionally be connected or detached with respect to a screw terminal of the third coupling element or the coupling element on the side of the hose assembly. An advantageous, alternative embodiment of a coupling connection for the transmission of particularly a fluid cooling medium from a coolant source or a welding unit in the direction of the hose assembly of its welding torch and vice versa is, to design the coolant coupling as a screw connection coupling. Such an embodiment can also resist relatively high pressures within the cooling circuit or high heat-related expansions of the cooling medium without any problems. The danger of an detaching separation of the coolant coupling device can thus be nearly eliminated.

In FIGS. 8a to 8d, the plug element 35 of the coolant coupling 33—see FIGS. 1 to 7—that has to be operated by the operator, is shown solely. In the following, the plug element 35 is described in connection with the drawings according to FIG. 1 and FIG. 3.

The plug element 35 is connected to an at least one coolant line 60, 60' extending to a coolant source 21. The plug element 35 preferably has two connection pieces 61, 61' which are separated in terms of flow, with a first connection piece 61 being connected or being able to be connected with a feed line 62 for a cooling medium leading to a coolant source 21 and a second connection piece 61' being connected or being able to be connected with a return line 63 for the heated cooling medium. By means of the plug element 35, the at least one coolant line 60, 60' on the side of the coolant source 21 can here optionally be coupled and decoupled in terms of flow with respect to the at least one coolant line 19, 19' in a hose assembly 24. In the flow-related coupled state between the plug element 35 and the coupling element 29, the cooling medium can be led from a coolant source 21 at least in the direction of a welding torch—see FIG. 1. Nevertheless, a cooling circuit 20 is preferably built by at least one coolant return lines 19', 60', as it was exemplarily shown in FIG. 1. In particular by means of the feed coolant lines 19, 60 and the return coolant lines 19', 60' and by the coolant coupling 33 integrated in terms of flow and comprising the plug element 35 and the coupling element 29, a cooling circuit 20 is created which is closed and can optionally be opened and closed.

To its securing with respect to a corresponding coupling element 29, preferably being designed as a coupling bushing 36, the plug element 35 has at least one clip-lock element 57, 58. The at least singly, preferably doubly designed clip-lock element 57, 58 is in this case such embodied that it can preferably be activated and deactivated without tools.

The first and the other hollow-cylindrical pin element 50, 50' at the plug element 35 are allocated to one feed and one return coolant line 19, 19' within the hose assembly 24 each. The connection pieces 61, 61' extend preferably perpendicularly, in particular at right angles to the tube-shaped pin elements 50, 50' of the plug element 35.

Wall sections opposite each other of the plug element 35 have a protrusion 52, 53 each for forming a positive-locking connection with a corresponding coupling element 29. The protrusions 52, 53 opposite each other are in this case embodied at spring-mounted clip-lock elements 57, 58.

According to an advantageous embodiment and with respect to the axial direction of the at least one pin element 50, 50', the plug element 35 is embodied in a continuingly or abruptly expanding way from the free end sections of the at least one pin element 50, 50', so that it has an approximately V-shaped outer contour or at least a protruding collar.

According to an appropriate embodiment, the plug element 35 is symmetrically embodied with respect to its connection interface 64—see FIG. 8—to a corresponding coupling element 29, being designed as a coupling bushing 36—see FIG. 3—so that it can be coupled with a corresponding coupling bushing 36 with respect to at least two freely selectable orientations that are changed by 180°.

It is furthermore possible to arrange at least one valve in the plug element 35, which is such designed that it prevents the cooling medium from discharging when the plug element is decoupled. Preferably, at least one valve for preventing the coolant from discharging is also arranged in the coupling element 29. The valves can be such embodied that in case of a shutting-off or interruption of the cooling circuit 20, a control is effected, that a most leak free possible decoupling of the plug element 35 can be effected. It is also possible that the valves are closed automatically, in particular by spring effect in case of a pressure drop, so that no active control of the valves is necessary. The valves can be particularly such designed that they automatically close in the event that the cooling circuit is shut off or the cooling process is terminated, in particular in the event of a pressure drop in the coolant lines 19 or 19' and/or 60, or 60'. It is also possible to use other safety devices or shut-off devices for preventing the discharge of fluid.

It is also possible that the cooling medium is pumped out of the lines, in particular out of the coolant lines 19, 19' when the welding process is finished, so that a safe or leak free decoupling of the plug connection 34, in particular a plugging off of the plug element 35 from the coupling element 29 is possible without a or without a critical discharging of fluids.

It is additionally possible to use the coupling element 26 as a connection between the hose assembly 24 and the welding torch 10, with the plug element 35 being allocated or connected to the welding torch 10 via lines, with the result that the welding torch 10 has furthermore to be coupled to the coupling element 29 in order to close the cooling circuit 20 when the welding torch 10 is connected to the coupling element 26. It is particularly possible that at each end of the hose assembly 24, a coupling element 26 is arranged, which can be connected with the corresponding coupling element 28 at the welding-related components, particularly at the welding device 1 or alternatively at an external wire feed device 11 and at the welding torch and then at each end of the hose assembly 24, a plug element 35, which is connected to the corresponding coolant lines of the welding-related components, is connected to the respective coupling element 29.

It is essential, that the coupling element 26, in particular the hose assembly 24, is connected to a corresponding coupling element 28 and the supply of fluid is connected to the coupling element 29 integrated in the coupling element 26 via the plug element 35, in order to create an unidirectional cooling path or preferably a closed cooling circuit 20.

From prior art it is known to lead the coolant lines out of the hose assembly 24 and to arrange a plug for the respective coolant line for being connected to a coolant source 21 at the end of the coolant line brought or led out. This means that all plugs that had to be connected to the corresponding couplings of the individual components were arranged at the hose assembly 24. According to the invention, the coupling element 26 is in contrary connected to the coupling element 28 by default, with the cooling medium being led into coolant lines 19, 19' of the hose assembly 24 via the separated plug element 35 and the corresponding coupling element 29, in order to cool the welding torch 10. The result is that the hose assembly 24 and the coupling element 26 essentially form an elongated, dimensionally stable cylinder, which can, among other things, be passed through the moving arms of hollow-shaft robots, without making it necessary to dismount the coolant lines or to pass the latter individually.

The previously described coupling device 27 or the coolant coupling 33 can of course also be used for connecting a cutting torch or a plasma torch to a corresponding hose assembly 24 or a unit for the supply of the respectively required operating media.

The exemplary embodiments refer to possible variants of embodiment of the hose assembly 24 or its coupling device 27 are not intended to limit the scope of the invention to these illustrated variants of embodiments provided herein but that there are also various combinations among the variants of the embodiments themselves and variations regarding the present invention should be executed by a person skilled in the art. All and every imaginable variants of the embodiment, arising from combining single details of the variant of embodiment illustrated and described are subject to scope of protection.

Finally, as a point of formality, it should be noted that for a better understanding of the structure of the hose assembly 24 or the coupling device 27 the latter or the latters and their components have not been represented true to scale in part and/or have been enlarged and/or reduced in size.

Above all, the individual embodiments of the subject matter illustrated in FIGS. 1; 2-8 may constitute independent solutions proposed by the invention in their own right. The objectives and associated solutions proposed by the invention may be found in the detailed descriptions of these drawings.

| List of Reference Numerals | |
| --- | --- |
| 1 | Welding device |
| 2 | Welding unit |
| 3 | Power element |
| 4 | Control device |
| 5 | Housing |
| 6 | Valve |
| 7 | Line |
| 8 | Welding gas |
| 9 | Gas tank |
| 10 | Welding torch |
| 11 | Wire feed device |
| 12 | Line |
| 13 | Welding wire |
| 14 | Delivery spool |
| 15 | Arc |
| 16 | Workpiece |
| 17 | Welding-current line |
| 18 | Welding-current line |
| 19, 19' | Coolant line |
| 20 | Cooling circuit |
| 21 | Coolant source |
| 22 | Fluid tank |
| 23, 23' | Input and/or output device |
| 24 | Hose assembly |
| 25 | Control line |
| 26 | Coupling element (2.) |
| 27 | Coupling device |
| 28 | Coupling element (1.) |
| 29 | Coupling element (3.) |
| 30 | Coupling element (4.) |
| 31, 31' | Connection interface |
| 32, 32' | Connection interface |
| 33 | Coolant coupling |
| 34 | Plug connection coupling |
| 35 | Plug element |
| 36 | Coupling bushing |
| 37 | Handle part |
| 38 | Guide body |
| 39 | Guide body |
| 40 | Guide bore |
| 41 | Longitudinal axis |
| 42 | Distance |
| 43 | Lateral surface |
| 44 | Transition interface |
| 45 | Connection block |
| 46, 46' | Coolant channel |
| 47 | Protective hose |
| 48 | Diameter |
| 49 | Diameter |
| 50, 50' | Pin element |

-continued

| List of Reference Numerals | |
| --- | --- |
| 51, 51' | Sealing element |
| 52 | Protrusion |
| 53 | Protrusion |
| 54 | Clip-lock connection |
| 55 | Undercut |
| 56 | Undercut |
| 57 | Clip-lock element |
| 58 | Clip-lock element |
| 59 | Coupling and decoupling device |
| 60, 60' | Coolant line |
| 61, 61' | Connection piece |
| 62 | Feed line |
| 63 | Return line |
| 64 | Connection interface |

The invention claimed is:

1. A coupling device comprising:
a first coupling element connectable with a hose assembly,
a second coupling element for at least one coolant line, wherein the second coupling element is embodied as a socket, is integrated in the first coupling element, and has at least one undercut, the coupling and decoupling direction of the second coupling element being orientated transverse to the longitudinal axis of the first coupling element or to a longitudinal axis of the hose assembly when the first coupling element is connected to the hose assembly, and
a plug element coupled to the second coupling element in that the at least one undercut of the second coupling element is connected in a positive-locking, mechanical way with the plug element, the plug element being embodied block-like and comprising a first hollow-cylindrical pin element embodied for the gas and fluid proof transmission of a cooling medium to the second coupling element, the plug element further comprising a second hollow-cylindrical pin element, the first hollow-cylindrical pin element being allocated for a feed coolant line for the cooling medium, and the second hollow-cylindrical pin element being allocated for a return coolant line for the cooling medium, the plug element further having a first connection piece for a feed line of a coolant line and having a second connection piece for a return line of the coolant line for the cooling medium, the first and second connection pieces extending transversely to the first and second hollow-cylindrical pin elements, the plug element having a connection interface and being embodied symmetrically with respect to the connection interface, the connection interface being able to be coupled with the socket in two orientations differing in 180°,
wherein the first and second coupling elements can each be coupled and decoupled independently from each other, and
wherein the socket is a plug connection.

2. The coupling device according to claim 1, wherein the second coupling element is arranged in an essentially dimensionally stable handle part or in the first coupling element.

3. The coupling device according to claim 1, wherein a visible area or a transition interface of the second coupling element is flush with an outer lateral surface of a handle part of the first coupling element or is arranged lowered with respect to an outer lateral surface of a handle part of the first coupling element.

4. The coupling device according to claim 2, wherein the second coupling element is arranged in an essentially dimensionally stable handle part,
  wherein the handle part is designed to be cylindrical, and
  wherein a maximum diameter of the handle part is adjusted to a feedthrough in a hollow-shaft robot.

5. The coupling device according to claim 1,
  wherein the plug element has at least one clip-lock element for securing the plug element to the second coupling element.

6. The coupling device according to claim 5,
  wherein the at least one clip-lock element comprises protrusions, and
  wherein wall sections opposite each other of the plug element comprise one protrusion each of the protrusions.

7. The coupling device according to claim 6, wherein the protrusions are embodied as spring-mounted clip-lock elements.

8. The coupling device according to claim 5,
  wherein the plug element is embodied in a continuingly or abruptly expanding way from a free end section of the first hollow-cylindrical pin element and of the second hollow-cylindrical pin element with respect to the axial direction of the first hollow-cylindrical pin element and of the second hollow-cylindrical pin element, so that the plug element has a V-shaped outer contour or at least a protruding collar.

9. The coupling device according to claim 1, wherein a handle part of the first coupling element has a depression or has a handle part undercut, and
  wherein a visible area or a transition interface of the at least one depression or the handle part undercut is flush with an outer lateral surface of the handle part or is arranged lowered with respect to an outer lateral surface of the handle part.

10. The coupling device according to claim 1, further comprising the hose assembly,
  wherein the first coupling element, the second coupling element, and the hose assembly together form an integral, structurally combined unit.

11. The coupling device according to claim 1, wherein a coupling and decoupling direction between the plug element and the depression or the undercut is aligned transverse to the coupling and decoupling direction of the first coupling element.

12. A hose assembly comprising:
  a plurality of supply lines, the supply lines comprising at least one coolant line for feeding a cooling medium, and
  at least one coupling device according to claim 1.

13. Welding device with a welding unit, a welding torch, and a hose assembly according to claim 12, wherein the welding torch is optionally detachably connected to the welding unit via the hose assembly.

14. Plug element for connection to a coupling device according to claim 1, wherein the plug element comprises at least one hollow-cylindrical pin element embodied for a gas- and waterproof transfer of a cooling medium with respect to the second coupling element, and wherein the plug element further comprises at least one clip-lock element for fixing of the plug element to the second coupling element.

15. The coupling device according to claim 1, wherein the socket does not protrude past a lateral surface of the first coupling element.

* * * * *